3,389,573
REFRIGERANT CONDENSATE CIRCUIT IN MULTIPLE-EFFECT ABSORPTION REFRIGERATION SYSTEMS
James A. Papapanu and Frank N. Decker, Jr., Syracuse, N.Y., assignors to Carrier Corporation, Syracuse, N.Y., a corporation of Delaware
Filed May 31, 1967, Ser. No. 642,371
2 Claims. (Cl. 62—101)

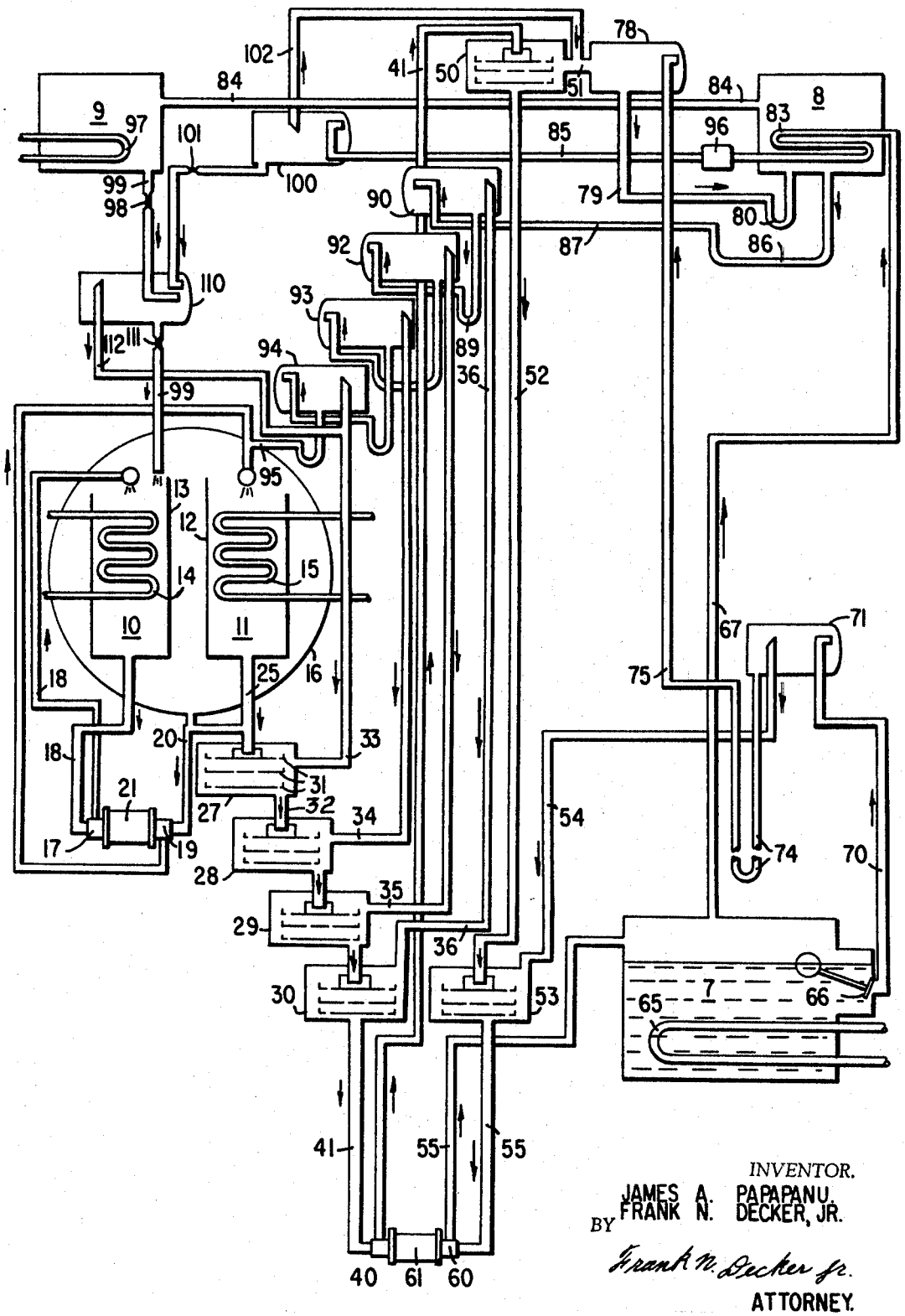

ABSTRACT OF THE DISCLOSURE

A double-effect absorption refrigeration system having a primary absorber, a primary evaporator, a high pressure generator, a low pressure generator, a high pressure condensing section, and a low pressure condenser, connected to provide refrigeration. A plurality of auxiliary absorber stages are connected in a weak solution line between the primary absorber and the high pressure generator. A plurality of auxiliary evaporator stages are connected in an intermediate solution line between the high pressure generator and the low pressure generator, and a plurality of auxiliary evaporator stages are connected in a strong solution line between the low pressure generator and the primary absorber. Stages of the auxiliary evaporators are connected by refrigerant vapor passages with the auxiliary absorbers so as to simultaneously concentrate and cool absorbent solution leaving the generator while also simultaneously heating and diluting weak solution passing to the generators. A high pressure refrigerant economizer is employed to evaporate a portion of the refrigerant condensed in the high pressure condenser to cool the remaining refrigerant therein, and the refrigerant vapor is passed to one of the auxiliary absorbers to further dilute and cool solution therein. A low pressure refrigerant economizer is employed to evaporate a portion of the refrigerant condensed in the low pressure condenser to cool the remainder thereof, and the vapor formed therein is passed to another auxiliary absorber to cool and dilute weak solution. Refrigerant liquid cooled in the high pressure refrigerant economizer is passed directly therefrom into the low pressure refrigerant economizer for further cooling.

Background of the invention

This invention relates to multiple-effect absorption refrigeration systems wherein the heat of the high pressure refrigerant vapor formed in the high pressure generator is reused to form additional low pressure refrigerant vapor, and to further concentrate absorbent solution in the low pressure generator. Both the high pressure refrigerant vapor and the low pressure refrigerant vapor are condensed and passed into the primary evaporator for evaporation therein to produce the refrigeration effect from the system.

It has been previously known to pass the condensed high pressure refrigerant directly into the primary evaporator where it is required to flash-cool down to the temperature and pressure of the primary evaporator. This system suffers the disadvantage that relatively warm high pressure refrigerant liquid passing into the primary evaporator flashes therein and produces a large amount of vapor. This flash vapor must be absorbed in the primary absorber before any useful cooling is produced by the system, and it therefore undesirably increases the absorber load. Furthermore, the heat of the flashed refrigerant is lost from the system without doing useful work, and actually increases the amount of strong solution which must be passed to the absorber in order to absorb it. Also, the large volume of refrigerant vapor produced by flashing in the primary evaporator may entrain droplets of liquid refrigerant which, if carried into the primary absorber, represents a significant loss of refrigeration capacity. The liquid droplets, which reach the absorber, are unevaporated refrigerant, which do not produce useful cooling and which dilute the absorbent solution in the absorber, thereby reducing the capacity of the system and its efficiency and increasing the heat input required to the generators.

In order to partially overcome some of these disadvantages, it has been proposed to flash-cool the high pressure refrigerant down to the low pressure condenser temperature, thereby reducing the amount of flash vapor formed in the primary evaporator. This arrangement has advantages in improving the capacity of the double-effect system, but it will be appreciated that the heat rejected from the flash vapor from the low pressure condenser represents a heat loss from the system, and it would be desirable to recover this heat in a manner so that it could provide useful cooling. Furthermore, even when the refrigerant is flash-cooled down to the temperature of the low pressure condenser, it still contains a significant amount of heat which is lost by flash-cooling in the primary evaporator. This heat causes excessive flashing in the evaporator and its attendant disadvantages previously described, and it represents heat which it would be desirable to utilize in the system, if possible, to improve the efficiency thereof.

In accordance with this invention, there is provided a multiple-effect absorption refrigeration system wherein a significant amount of heat is recovered from the refrigerant condensed in the low pressure generator, while, at the same time, the refrigerant is cooled to a lower temperature and pressure than that in the low pressure condenser, so as to reduce loss of capacity and efficiency due to excessive flashing in the primary evaporator.

Summary of the invention

This invention achieves the advantages thereof by utilizing a low pressure refrigerant economizer having a pressure therein intermediate the pressures in the low pressure condenser and he primary absorber. In addition, a high pressure refrigerant economizer is employed having a pressure therein intermediate the pressures in the high pressure condenser and that in the low pressure refrigerant economizer. The refrigerant condensed in the high pressure condenser is passed to the high pressure refrigerant economizer, where a portion is evaporated, to cool the remainder. The refrigerant cooled in the high pressure refrigerant economizer is passed directly therefrom into the low pressure refrigerant economizer. Likewise, the refrigerant condensed in the low pressure condenser is also passed to the low pressure refrigerant economizer. A portion of the refrigerant in the low pressure economizer is evaporated therein to cool the remainder. The remaining cooled refrigerant is passed from the low pressure refrigerant economizer to the primary evaporator for evaporation therein to produce the refrigeration effect of the system. The refrigerant evaporated in the low pressure refrigerant economizer is absorbed into weak solution passing from the primary absorber to the high pressure generator in a low pressure auxiliary absorber, where it serves to heat and dilute the weak solution. The refrigerant evaporated in the high pressure refrigerant economizer is also absorbed in weak solution passing from the primary absorber to the high pressure generator in a high pressure auxiliary absorber stage where it serves to further heat and further dilute weak solution passing to the high pressure generator.

Consequently, a large portion of the excess heat contained in the refrigerant passing to the primary evaporator is absorbed into the weak solution where it serves to usefully preheat the solution and to reduce the quantity of heat required to boil it in the high pressure generator. At the same time, the absorption of the refrigerant vapor formed in the low pressure refrigerant economizer dilutes the weak solution into which it is absorbed, thereby reducing the solution concentration in the high pressure generator. The dilution of the solution reduces the heat required to boil a given amount of refrigerant from the solution and thereby reduces the temperature required in the generator, which in turn lessens the corrosion rate of metal parts therein and decreases the need for costly corrosion resistant materials. At the same time, it will be appreciated that by recovering the heat of the liquid refrigerant in the weak solution, not only is the efficiency of the machine increased, but the problems with the excessive flashing in the absorber are significantly alleviated.

*Brief description of the drawing*

The drawing illustrates a schematic cross-section through a double-effect absorption refrigeration system in accordance with a preferred embodiment of this invention.

*Description of the preferred embodiment*

Referring to the drawing, there is shown a multiple-effect absorption refrigeration system of a type which employs two effects and may use water as a refrigerant and an aqueous solution of hygroscopic salt, such as lithium bromide, as an absorbent. Various additives may be added to the solution, such as 2-ethyl hexanol, to enhance heat transfer, and lithium hydroxide to inhibit corrosion. As used herein "weak" solution refers to a solution weak in absorbent salt and absorbing power, and "strong" solution refers to a solution strong in absorbent salt and absorbing power.

The double-effect absorption system comprises a high pressure generator 7, a low pressure generator 8 having a high pressure condenser section associated therewith, a low pressure condenser 9, a primary absorber 11 and a primary evaporator 10.

Primary evaporator 10 and primary absorber 11 are preferably disposed within a single low pressure shell 16. An internal partition 12 forms a primary absorber chamber and an internal partition 13 forms a primary evaporator chamber within shell 16. A plurality of evaporator heat exchange tubes 14 are arranged within partition 13 for passage of a fluid medium, such as water, to be chilled by the refrigeration system. A plurality of absorber heat exchange tubes 15 are disposed within partition 12 and arranged for passage of a cooling medium, such as water, to a suitable heat rejection location, such as a conventional cooling tower.

Liquid refrigerant is distributed over evaporator tubes 14 and is evaporated to cool the fluid passing through the evaporator tubes. The unevaporated refrigerant liquid passes from the bottom of a sump formed by partition 13 through an evaporator recirculation pump 17 and recirculation passage 18 from which it is again distributed over evaporator tubes 14.

Cool, concentrated, strong absorbent solution is distributed over absorber tubes 15 and cooled by heat exchange with the medium passing therethrough. A portion of the absorbent solution collected in t he bottom of a sump formed by partition 12 is recirculated by absorber recirculation pump 19 through recirculation line 20 from which it is again discharged over absorber tubes 15. A single electric motor 21 may operate both pumps 17 and 19.

The absorbent solution in primary absorber 11 is diluted by absorption of refrigerant vapor therein from primary evaporator 10. Cold, moderately weak absorbent solution passes through moderately weak solution passage 25 from the bottom of partition 12 and shell 16 into the first stage 27 of a low pressure auxiliary absorber. From there, the moderately weak solution passes into second stage 28, third stage 29, and fourth stage 30 of the low pressure auxiliary absorber. Each of the stages may be substantially similar and preferably comprises a plurality of perforated liquid distribution pans 31 arranged for cascading flow of liquid from one pan to the succeeding pan throughout each stage. A connecting passage 32 passes solution from first stage 27 to second stage 28 and similar connecting passages are provided between the succeeding stages. A refrigerant vapor inlet passage 33 admits refrigerant vapor to be absorbed into first stage 27, and similar refrigerant vapor inlet passages 34, 35 and 36 admit refrigerant vapor into their respective succeeding stages of the low pressure auxiliary absorber.

A low pressure weak solution pump 40 passes warm weak solution from the last stage 30 of the low pressure auxiliary absorber through weak solution passage 41 to the first stage 50 of a high pressure auxiliary absorber. First stage 50 of the high pressure auxiliary absorber may be similar in construction to first stage 27 of the low pressure auxiliary absorber and is provided with a refrigerant vapor inlet passage 51 to admit refrigerant vapor into the stage for absorption into absorbent solution therein. A connecting passage 52 passes solution from first stage 50 to a second stage 53 of the high pressure auxiliary absorber. Second stage 53 is provided with a refrigerant vapor passage 54 for admitting refrigerant vapor into the stage for absorption into absorbent solution therein. The resulting very weak, very warm, absorbent solution is passed through very weak solution line 55 by very weak solution pump 60 into high pressure generator 7 for concentration therein. Pumps 40 and 60 may be driven by a single electric motor 61.

High pressure generator 7 includes generator heat exchange tubes 65 for passing steam in heat exchange relation with absorbent solution therein. Other heating media may be employed, or alternatively, the generator may be directly fired by a combustible gas. The absorbent solution in generator 7 is boiled to vaporize refrigerant and to concentrate the solution. Hot intermediate strength absorbent solution passes from high pressure generator 7 through float valve 66 and intermediate solution passage 70, to the first stage 71 of a high pressure auxiliary evaporator.

Stage 71 may comprise a hollow vessel in which the incoming solution is discharged against one wall thereof to prevent carryover of liquid droplets into the vapor outlet passage. Refrigerant vapor passage 54 terminates in the vapor space within high pressure auxiliary evaporator stage 71. This passage conducts refrigerant vapor evaporated in high pressure auxiliary evaporator first stage 71 to the last stage 53 of the high pressure auxiliary absorber.

Intermediate solution passes from the first stage 71 of the high pressure auxiliary absorber through a solution trap 74 in passage 75 to second stage 78 of the auxiliary high pressure evaporator, which may be similarly constructed to that of the first stage 71. Refrigerant vapor passage 51 conducts refrigerant vapor from second stage 78 of the auxiliary high pressure evaporator to first stage 50 of the high pressure auxiliary absorber.

Refrigerant vapor is evaporated from the intermediate absorbent solution in the stages of the high pressure auxiliary evaporator, thereby simultaneously concentrating and cooling the hot intermediate strength solution to form moderately hot, concentrated intermediate solution. The concentrated intermediate solution passes through intermediate solution passage 79 and solution trap 80 into low pressure generator 8..

The various solution traps, such as traps 74 and 80, are designed to have a vertical height, such that the level of solution in the leg thereof connecting with the next lower pressure stage, balances the solution level and the pressure difference from the previous higher pressure zone to prevent vapor from passing between the stages.

Low pressure generator 8 comprises a combined generator-condenser and is provided with heat exchange tubes 83 which form a high pressure condenser section therein. The hot refrigerant vapor formed in high presssure generator 7 passes through high pressure refrigerant vapor passage 67 and heat exchange tubes 83 to boil the solution in the lower pressure generator while condensing the vapor within heat exchange tubes 83. The refrigerant vapor formed in the low pressure generator passes through low pressure refrigerant vapor passage 84 to low pressure condenser 9. The strong absorbent solution formed in low pressure generator 8 passes through solution trap 86 and strong solution passage 87 to the first stage 90 of an auxiliary low pressure evaporator. The refrigerant condensed in high pressure condenser tubes 83 passes through steam trap 96 to high pressure refrigerant economizer 100.

First stage 90 and the succeeding stages of the low pressure auxiliary evaporator may be constructed similarly to first stage 71 of the high pressure auxiliary evaporator. Refrigerant vapor passage 36 extends from the last stage 30 of the low pressure auxiliary absorber and terminates in the vapor space in first stage 90 of the low pressure auxiliary evaporator to conduct refrigerant vapor formed in first stage 90 to last stage 30. The strong absorbent solution passes from first stage 90 of the low pressure auxiliary evaporator through solution trap 89 into second stage 92 in which additional refrigerant is evaporated from the solution. The solution then passes into succeeding stages 93 and 94 where still further evaporation of refrigerant vapor takes place. Second stage 92 of the low pressure auxiliary evaporator is in vapor communication with third stage 29 of the low pressure auxiliary absorber through refrigerant vapor passage 35, and similarly third stage 93 and fourth stage 94 are in communication with second stage 28 and first stage 27, through refrigerant vapor passages 34 and 33 respectively.

The concentrated strong absorbent solution passes from last stage 94 through a solution trap into concentrated strong solution line 95 from which it is discharged over absorber heat exchange tubes 15 is primary absorber 11.

The low pressure refrigerant vapor passes from low pressure refrigerant vapor passage 84 into low pressure condenser 9 and is condensed therein by heat exchange with a suitable cooling medium passing through condenser heat exchange tubes 97. The cooling medium rejects heat from low pressure condenser 9 to a suitable location, such as a cooling tower. Also, high pressure liquid refrigerant passes from high pressure refrigerant liquid passage 85 into high pressure refrigerant economizer 100 and is partially evaporated therein by flashing, thereby cooling the remainder thereof upon being discharged in the low pressure condenser. The resulting vapor is recondensed in condenser 9.

Condensed refrigerant passes from low pressure condenser 9 through restriction 98 in low pressure refrigerant passage 99 and is discharged over evaporator heat exchange tubes 14 in primary evaporator 10.

A high pressure refrigerant economizer 100 is disposed in the high pressure refrigerant passage 85. High pressure refrigerant economizer 100 may comprise a vessel similar in construction to the auxiliary evaporator stages. A portion of the liquid refrigerant passing to the high pressure refrigerant economizer is evaporated therein to cool the remaining liquid refrigerant. The refrigerant vapor formed in the high pressure economizer passes through refrigerant vapor passage 102 into refrigerant vapor passage 51 and is absorbed in first stage 50 of the high pressure auxiliary absorber. Thus, the warm refrigerant liquid from the high pressure condenser is cooled prior to passing to the primary absorber and the refrigerant vapor formed in the high pressure economizer is absorbed into weak solution to heat and dilute the weak solution. The cooled high pressure refrigerant liquid passes through a high pressure refrigerant liquid restriction 101 to low pressure refrigerant economizer 110. Steam trap 96 and restriction 101 maintain a pressure zone in the high pressure refrigerant economizer 100 intermediate the pressures in high pressure condenser 8 and low pressure economizer 110.

Low pressure refrigerant economizer 110 is disposed in low pressure refrigerant liquid passage 99 and is similar in construction to economizer 100. Refrigerant vapor formed therein passes through vapor passage 112 and passage 33 into first stage 27 of the low pressure absorber. Low pressure refrigerant restriction 111 and restriction 98 are disposed in the inlet and discharge passages associated with low pressure refrigerant economizer 110 to maintain a pressure zone therein, intermediate the pressures in low pressure condenser 9 and primary evaporator 10. A portion of the liquid refrigerant in low pressure refrigerant economizer 110 is evaporated therein to cool the remaining refrigerant prior to its discharge over primary evaporator heat exchange tubes 14. The refrigerant vapor thus formed is absorbed into and dilutes and heats the cold moderately weak solution in first stage 27 of the low pressure auxiliary absorber.

In operation, the pressures in serially connected low pressure auxiliary absorber stages 27, 28, 29 and 30 successively increase in the direction of solution flow therethrough from primary absorber 11 toward the high pressure auxiliary absorber and high pressure generator 7. The low pressure auxiliary absorber stages form successively increasing pressure zones intermediate the pressures in primary absorber 11 and first stage 50 of the high pressure auxiliary absorber.

Similarly, the pressure in second stage 53 of the high pressure auxiliary absorber is greater than the pressure in first stage 50 thereof. Both serially connected stages from successively increasing pressure zones intermediate the pressure in last stage 30 of the low pressure auxiliary absorber and the high pressure generator 7, in the direction of solution flow therethrough from primary absorber 11 to high pressure generator 7.

Moderately weak, cold, absorbent solution from primary absorber 11 is successively diluted and heated in the stages of the low pressure auxiliary absorber by absorption of refrigerant vapor therein, to form warm weak solution which passes to the high pressure auxiliary absorber. The warm weak solution is successively further diluted and further heated by absorption of refrigerant vapor therein, as it passes through the stages of the high pressure auxiliary absorber to form very warm, very weak absorbent solution which passes to high pressure generator 7.

The quantity of refrigerant which can be formed by boiling weak solution in the high pressure generator at a given temperature is greatly increased because the solution passed thereto is very weak in absorbent salt. Thus, a low generator temperature becomes feasible by use of this invention. In addition, very weak solution results in a much lower corrosion rate of metal parts in the high pressure generator than would occur with stronger solution at the same temperature level.

The intermediate strength absorbent solution from the high pressure generator is further concentrated as it passes through the high pressure auxiliary evaporators by the evaporation of refrigerant vapor therein. At the same time, not only is the concentration of the solution increased, but its temperature is reduced so that only moderately hot but concentrated intermediate solution passes into the low pressure generator.

The absorbent solution is further cooled and concentrated by evaporation of refrigerant therefrom in the low pressure generator and the moderately cool strong solution is serially passed through the stages of the low pressure auxiliary evaporator. Still further, refrigerant vapor is evaporated from the strong solution in the low pressure auxiliary evaporator stages. The solution is further cooled, due to the evaporation of refrigerant therefrom and the cool concentrated strong solution is passed to the primary absorber to absorb refrigerant vapor therein.

The refrigerant cooled in high pressure refrigerant economizer 100 and that condensed in low pressure condenser 9 is passed directly into low pressure refrigerant economizer 110. Consequently, a portion of each of the refrigerant streams passing to the low pressure economizer is evaporated therein and the remaining refrigerant liquid is cooled down to a temperature and pressure relatively close to that existing in primary evaporator 10. Since this refrigerant is cooled to a relatively low temperature and pressure, the amount of flashing taking place in the primary evaporator is greatly reduced. Since less refrigerant is required to flash in the primary evaporator, less refrigerant vapor and less non-useful cooling is required in the primary evaporator, and the absorber load is decreased. Also, the problems, attendant flashing of refrigerant in the primary evaporator, such as refrigerant liquid carryover into the absorber, are reduced, as is the amount of heat which must be rejected to the cooling fluid passing through absorber heat exchange tubes 15. In addition, the temperature level and heat input to the generator is reduced because the diluted solution boils at a lower temperature and it is preheated by absorption of vapor therein, so the system is more efficient and corrosion is reduced.

Thus, by employing a multiple-effect absorption refrigeration system in accordance with this invention, the heat contained in the refrigerant condensate is re-used in the refrigeration system to provide useful preheating of weak solution and the efficiency and capacity of the system are improved in comparison with prior arrangements.

It will be appreciated that an absorption refrigeration system embodying this invention may utilize more than two effects and consequently the terms "high pressure," "low pressure," "strong," "weak," and "intermediate" and other similar terms are used merely for clarity to distinguish relative relationship of the components, solutions, temperatures or pressures and not as a limitation on the number of effects in the cycle.

It will be appreciated that various modifications may be made to the preferred embodiment of this invention described herein and to the physical construction of the components thereof without departing from the principles and advantages of this invention. For example, one or more of the stages of the auxiliary absorbers and evaporators could be replaced with conventional heat exchangers, if desired, although it is desirable to employ auxiliary absorbers in any event for absorption of vapor from the refrigerant economizers.

Accordingly, this invention may be otherwise embodied in the scope of the following claims.

We claim:
1. An absorption refrigeration system comprising:
   (a) a primary absorber;
   (b) a primary evaporator;
   (c) a high pressure generator;
   (d) a low pressure generator having a high pressure condenser section associated therewithin;
   (e) a low pressure condenser;
   (f) weak solution passage means for passing weak absorbent solution from said primary absorber to said high pressure generator for concentration therein;
   (g) intermediate solution passage means for passing intermediate strength absorbent solution from said high pressure generator to said low pressure generator for further concentration therein;
   (h) strong solution passage means for passing strong absorbent solution from said low pressure generator to said primary absorber for absorption of refrigerant vapor therein;
   (i) high pressure refrigerant vapor passage means for passing high pressure refrigerant vapor formed in said high pressure generator through the high pressure condenser section of said low pressure generator for condenser said vapor and heating solution in said low pressure generator;
   (j) low pressure refrigerant vapor passage means for passing low pressure refrigerant vapor formed in said low pressure generator to said low pressure condenser for condensing said vapor;
   (k) refrigerant vapor passage means for passing evaporated refrigerant from said primary evaporator to said primary absorbent for absorption into absorbent solution;

wherein the improvement comprises:
   (l) a low pressure auxiliary absorber, disposed on said weak solution passage, having a pressure therein intermediate the pressures in said primary absorber and said high pressure generator;
   (m) a low pressure refrigerant economizer having a pressure therein intermediate the pressures in said low pressure condenser and said primary evaporator and substantially the same as the pressure in said low pressure auxiliary absorber;
   (n) a high pressure auxiliary absorber, disposed in said weak solution passage, having a pressure therein intermediate the pressures in said low pressure auxiliary absorber and said high pressure generator;
   (o) a high pressure refrigerant economizer having a pressure therein intermediate the pressures in said high pressure condenser and said low pressure refrigerant economizer and substantially the same as the pressure in said high pressure auxiliary absorber;
   (p) refrigerant liquid passage means of passing refrigerant condensed in said high pressure condenser from said high pressure condenser into said high pressure refrigerant economizer, for evaporating a portion of said high pressure refrigerant liquid to cool the remainder thereof;
   (q) refrigerant liquid passage means for passing cooled refrigerant liquid directly from said high pressure refrigerant economizer into said low pressure refrigerant economizer, for evaporating a portion of said refrigerant liquid to cool the remainder thereof;
   (r) refrigerant vapor passage means connecting said low pressure refrigerant economizer and said low pressure auxiliary absorber for passing refrigerant vapor evaporated in said low pressure refrigerant economizer to said low pressure auxiliary absorber for absorption therein to thereby heat and dilute the weak solution in said low pressure auxiliary absorber prior to passage thereof to said high pressure generator;
   (s) refrigerant vapor passage means connecting said high pressure refrigerant economizer and said high pressure auxiliary absorber for passing refrigerant vapor evaporated in said high pressure refrigerant economizer to said high pressure auxiliary absorber for absorption therein to thereby heat and dilute the weak solution in said high pressure auxiliary absorber prior to passage thereof to said high pressure generator;
   (t) refrigerant liquid passage means for passing refrigerant condensed in said low pressure condenser from said low pressure condenser into said low pressure refrigerant economizer, for evaporating a portion of said low pressure refrigerant liquid to cool the remainder thereof; and
   (u) refrigerant liquid passage means for passing cooled refrigerant from said low pressure refrigerant economizer to said primary evaporator, for evaporation therein.

2. A method of producing refrigeration from an absorption refrigeration system having a primary absorber, a primary evaporator, a high pressure generator, a low pressure generator associated with a high pressure condenser, and a low pressure condenser, operatively connected to form a multiple-effect absorption refrigeration system, the steps comprising:

(a) evaporating refrigerant in the primary evaporator to provide cooling, and absorbing the evaporated refrigerant in an absorbent solution in said primary absorber, thereby forming weak absorbent solution;

(b) heating said weak absorbent solution in the high pressure generator to form intermediate strength absorbent solution and high pressure refrigerant vapor;

(c) heating intermediate strength solution in said low temperature generator by condensing high pressure refrigerant vapor in said high pressure condenser in heat exchange relation with intermediate strength solution in said low pressure generator to form strong absorbent solution and low pressure refrigerant vapor;

(d) condensing said low pressure refrigerant vapor in said low temperature condenser;

(e) passing said strong solution to said primary absorber for reabsorption of refrigerant vapor;

wherein the improvement comprises:

(f) passing high pressure liquid refrigerant condensed in said high pressure condenser from said high pressure condenser into a high pressure evaporating zone having a pressure intermediate the pressures in said high pressure condenser and said primary evaporator, and evaporating a portion of said high pressure refrigerant in said high pressure evaporating zone to cool the remainder thereof;

(g) passing liquid refrigerant cooled in said high pressure evaporating zone directly from said high pressure evaporating zone into a low pressure evaporating zone having a pressure lower than the pressure in said low pressure condenser and intermediate the pressures in said high pressure evaporating zone and said primary evaporator, and evaporating a portion of said liquid refrigerant in said low pressure evaporating zone to cool the remainder thereof;

(h) passing low pressure liquid refrigerant condensed in said low pressure condenser from said low pressure condenser into said low pressure evaporating zone and evaporating a portion of said low pressure refrigerant in said low pressure evaporating zone to cool the remainder thereof;

(i) absorbing the refrigerant vapor evaporated in said high pressure evaporating zone in weak solution passing from said primary absorber to said high pressure generator in a high pressure absorbing zone having a pressure intermediate the pressures in said primary absorber and said high pressure generator and having a pressure substantially equal to the pressure in said high pressure evaporating zone, thereby heating and diluting weak solution passing from said primary absorber prior to passing into said high pressure generator;

(j) absorbing the refrigerant vapor evaporated in said low pressure evaporating zone in weak solution passing from said primary absorber to said high pressure generator in a low pressure absorbing zone having a pressure intermediate the pressures in said primary absorber and said high pressure absorbing zone and having a pressure substantially equal to the pressure in said low pressure evaporating zone, thereby heating and diluting weak solution passing from said primary absorber into said high pressure generator; and (k) passing the cooled liquid refrigerant from said low pressure evaporating zone to said primary evaporator for evaporation therein.

References Cited
UNITED STATES PATENTS

| | | | |
|---|---|---|---|
| 2,283,213 | 5/1942 | Katzow | 62—484 X |
| 2,755,635 | 7/1956 | Bourne | 62—101 |
| 3,266,266 | 8/1966 | Reid | 62—476 |
| 3,273,350 | 9/1966 | Taylor | 62—101 |
| 3,287,928 | 11/1966 | Reid | 62—476 |
| 3,316,727 | 5/1967 | Bourne | 62—101 |

LLOYD L. KING, *Primary Examiner.*